United States Patent [19]

Akiyama

[11] 3,936,848

[45] Feb. 3, 1976

[54] INDEPENDENT MIRROR SWING-UP MEANS IN A SINGLE LENS REFLEX CAMERA WITH MEMORY EXPOSURE DEVICE

[75] Inventor: Kazuhiro Akiyama, Omiya, Japan

[73] Assignee: Fuji Photo Optical Co., Ltd., Omiya, Japan

[22] Filed: Oct. 15, 1973

[21] Appl. No.: 406,317

[30] Foreign Application Priority Data

Oct. 20, 1972 Japan............................. 47-105035

[52] U.S. Cl.............................. 354/156; 354/51
[51] Int. Cl.²..................... G03B 19/12; G03B 7/08
[58] Field of Search......... 354/50, 51, 57, 156, 154; 95/10

[56] References Cited
UNITED STATES PATENTS

| | | | |
|---|---|---|---|
| 3,503,313 | 3/1970 | Kuromoto............................. | 95/10 |
| 3,543,658 | 12/1970 | Reimann............................... | 95/10 |
| 3,623,410 | 11/1971 | Meta....................................... | 95/10 |
| 3,643,572 | 2/1972 | Hurei................................... | 354/156 |

*Primary Examiner*—L. T. Hix
*Assistant Examiner*—E. M. O'Connor

[57] ABSTRACT

A manually operable mirror swing-up lever is associated with an exposure information memorizing device. The exposure information memorizing device has a locking lever which locks a sliding contact movable on a variable resistor at a position representing the exposure information. The variable resistor is connected in parallel with a memory capacitor in an electric circuit for controlling an electric shutter. The terminal voltage of the variable resistor is controlled to be equivalent to the terminal voltage of the memory capacitor. When the mirror is swung up by the manually operable mirror swing-up lever, the sliding contact is locked in position to make the variable resistor work as an equivalent for the capacitor, and the resistor is substituted for the memory capacitor.

14 Claims, 4 Drawing Figures

INDEPENDENT MIRROR SWING-UP MEANS IN A SINGLE LENS REFLEX CAMERA WITH MEMORY EXPOSURE DEVICE

BACKGROUND OF THE INVENTION

1. Field of the Invention

This invention relates to a means for independently swinging up a mirror in a single lens reflex camera in which the exposure is controlled by an electric shutter means, and more particularly to a mirror swing-up means including an exposure value memorizing means which is operated in response to the swing up of the mirror in a single lens reflex camera with a memory type electric shutter means.

2. Description of the Prior Art

A single lens reflex camera including a swing mirror and an electric shutter has been well known in the art. In this type of a camera, the swing mirror is swung up in response to the release of the shutter means. Therefore, the shock by the swing of the mirror is transmitted to the camera body simultaneously with the release of the shutter, which results in a vibration of the camera body and accordingly the image is liable to be blurred thereby.

It is desirable, therefore, to swing up the mirror independently of the release of the shutter. In a single lens reflex camera of TTL (Through The Lens) type in which the quantity of light passing through the taking lens is measured by use of a photoelectric element located in a view finder system receiving the light reflected from the mirror, the light cannot be measured after the mirror is swung up and accordingly the automatic exposure control by the electric shutter would become impossible, if the mirror is swung up before and independently of the release of the shutter. Further, in a single lens reflex camera used for scientific purposes such as in a microscopic photography system, it is sometimes desired to repeatedly take pictures of the same object. In such a case, if the mirror is swung up before the release of the shutter, the exposure control for the repeated release of the shutter is impossible.

SUMMARY OF THE INVENTION

In light of the above-described defects of the conventional single lens reflex camera, the primary object of the present invention is to provide an independent mirror swing up means for a single lens reflex camera in which the mirror is swung up before and independently of the release of the shutter and the exposure value measured by a photometering means in the camera is memorized when the mirror is swung up.

Another object of the present invention is to provide an independent mirror swing up means for a single lens reflex camera in which the exposure information is memorized when the mirror is independently swung up and the shutter can be repeatedly released under the same conditions.

Still another object of the present invention is to provide an independent mirror swing up means for a single lens reflex camera in which the camera body is completely free from vibration caused by the movement of the mirror when the shutter is released.

A further object of the present invention is to provide an independent mirror swing up means for a single lens reflex camera in which the shutter speed actually obtained is indicated in the view finder of the camera automatically when the swing mirror is swung up before the release of the shutter.

In accordance with the present invention, the above objects are accomplished by providing an exposure information memorizing means in association with a mirror swing up mechanism. A variable resistor is connected in parallel with a memory capacitor which memorizes the exposure information given by a photoelectric element. The variable resistor is set to have a terminal voltage equivalent to the terminal voltage of the memory capacitor and is locked in its position when the mirror is swung up and the photoelectric element is blocked from the light from the subject to be photographed. Then, the variable resistor is substituted for the capacitor to give the exposure information instead of the memory capacitor to the exposure control means such as an electric shutter. In order to cause the resistor to memorize the exposure information, a sliding contact movable on the variable resistor is locked in response to the manual swing up of the mirror at a position which represents said equivalent voltage indicating the exposure value. The lock of the sliding contact is performed by means of a locking mechanism operated in association with and in response to the actuation of a manually operable mechanism for independently swinging up the mirror.

In this invention, the mirror is also swingable automatically by means of an automatic mirror swing up means which is not associated with the locking mechanism. If the locking means is not manually operated to lock the exposure information, the mirror is swung up simultaneously with the release of the shutter as in a conventional single lens reflex camera.

Other objects, features and advantages of the present invention will be made apparent from the following detailed description of the preferred embodiment thereof taken in conjunction with the accompanying drawing as follows.

DESCRIPTION OF THE PREFERRED EMBODIMENT

Figure 1:
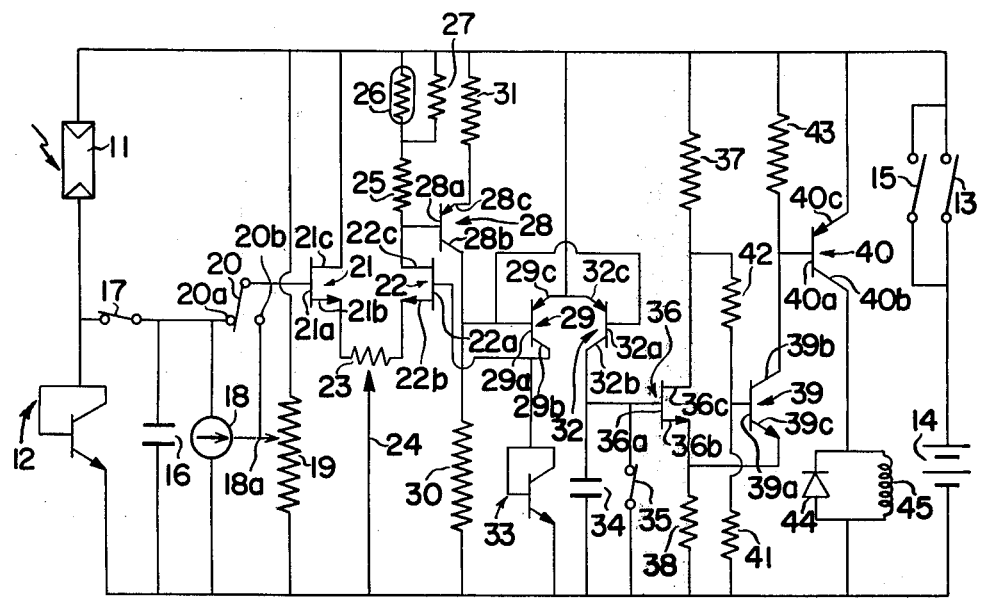
FIG. 1 is a circuit view showing an electric circuit for controlling a shutter speed used in connection with the mirror swing-up means in accordance with the present invention.

Referring first to FIG. 1 showing an electric circuit for controlling a shutter employed in this invention, which is similar conventional circuitry except that a variable resistor is employed to be substituted for a memory capacitor, a photoelectric element 11 is connected in series with a logarithmic compression diode 12 and a power supply switch 13 across a power source 14. The power supply switch 13 is closed upon depression of a shutter button (not shown). In parallel with the power supply switch 13 is a second power supply switch 15. In parallel with the logarithmic compression diode 12 is connected a memory capacitor 16 by way of a normally closed switch 17. The normally closed switch 17 is opened upon further depression of the shutter button immediately before the release of the shutter. After the switch 17 is closed, the terminal voltage of the logarithmic compression diode 12 which is in proportion to the illumination of the subject to be photographed measured by the photoelectric element 11 is memorized by the memory capacitor 16. In parallel with the memory capacitor 16 is connected a galvanometer 18 which measures the terminal voltage of the memory capacitor 16. The galvanometer 18 has a needle 18a whose movement is determined by the terminal voltage of the capacitor 16 and which slides during such movement on a variable resistor 19 connected across said power source 14 by way of said parallel switches 13 and 15. The needle 18a is made of conductive material and electrically connected with a contact 20b of a change-over switch 20. It will be appreciated that the potential at contact 20b is determined by the position of the needle 18a on the variable resistor 19. The change-over switch 20 has another contact 20a connected with the connecting point of said memory capacitor 16 and the galvanometer 18. The change-over switch 20 is selectively put into contact with the two contacts 20a and 20b to selectively couple the contact 20a or 20b to the gate 21a of a field effect transistor 21. The source 21b of the field effect transistor 21 is connected with the source 22b of another field effect transistor 22 by way of a variable resistor 23. A sliding contact 24 sliding on the variable resistor 23 is grounded. The drain 21c of the first field effect transistor 21 is connected with the power source 14 by way of the switches 13 and 15 and the drain 22c of the second field effect transistor 22 is connected with the drain 21c of the first field effect transistor 21 by way of a series circuit of a resistor 25 and a thermistor 26. In parallel with the thermistor 26 is connected a resistor 27. With the drain 22c of the second field effect transistor 22 is connected the base 28a of a first transistor 28, the collector 28b of which is connected with the base 29a of a second transistor 29. The collector 28b of the first transistor 28 is grounded through a resistor 30 and the emitter 28c thereof is connected with the power source 14 by way of a resistor 31. The gate 22a of the second field effect transistor 22 is connected with the collector 29b of the second transistor 29. The base 29a of the second transistor 29 is connected with the base 32a of a third transistor 32 the emitter 32c of which is connected with the emitter 29c of the second transistor 29. The emitters 29c and 32c of the both transistors 29 and 32 are connected with the power source 14 by way of said parallel switches 13 and 15. The collector 29b of the second transistor 29 is grounded by way of a logarithmic expansion diode 33, and the collector 32b of the third transistor 32 is grounded by way of a timing capacitor 34. Since the base 29a of the second transistor 29 is connected with the base 32a of the third transistor 32, the collector voltages of the both transistors 29 and 32 are equal to each other, and accordingly the current flowing through the logarithmic expansion diode 33 is equal to the current flowing through the timing capacitor 34.

The first transistor 28 and the second transistor 29 constitute a feed back circuit to make the gate voltage of the first field effect transistor 21 equal to the gate voltage of the second field effect transistor 22. This is because the drain current of the second field effect transistor 22 decreases and the first transistor 28 is almost turned OFF when the gate voltage of the first field effect transistor 21 increases, and accordingly, the second transistor 29 is turned ON to raise the gate voltage of the second field effect transistor 22 up to the level equal to the gate voltage of the first field effect transistor 21.

In parallel with said timing capacitor 34 is connected a normally closed switch 35 to short circuit the timing capacitor 34. The normally closed switch 35 is opened upon start of a leading shutter of a focal plane shutter of the camera. That is, the open of the switch 35 means the start of the exposure time controlled by the focal plane shutter operated by the electric circuit. When the switch 35 is opened, the electric current equal to the current flowing through the logarithmic expansion diode 33 starts to flow through the timing capacitor 34 and the capacitor 34 is charged thereby. The normally closed switch 35 and the collector 32b of the third transistor 32 are connected with the gate 36a of a third field effect transistor 36. The drain 36c of the third field effect transistor 36 is connected with the power supply switches 13 and 15 by way of a resistor 37, and the source 36b thereof is grounded through a resistor 38. The source 36b of the third field effect transistor 36 is connected with the emitter 39c of a fourth transistor 39, the collector 39b of which is connected with the base 40a of a fifth transistor 40. The base 39a of the fourth transistor 39 is grounded by way of a resistor 41 and is connected with the drain 36c of the third field effect transistor 36 by way of a resistor 42. The base 40a of the fifth transistor 40 is connected with the power supply switches 13 and 15 by way of a resistor 43. The emitter 40c of the fifth transistor 40 is connected with the supply switches 13 and 15. The collector 40b of the fifth transistor 40 is grounded by way of a parallel circuit of a diode 44 and a trailing shutter holding magnet 45. The magnet 45 actuates a solenoid (not shown) when energized to hold the trailing shutter of the focal plane shutter of the camera. When the magnet 45 is de-energized, the solenoid is released to let the trailing shutter run after the leading shutter. Therefore, the de-energization of the magnet 45 means the end of the exposure time by the closure of the focal plane shutter.

The fourth and fifth transistors 39 and 40 constitute a switch circuit to energize and de-energize the trailing shutter holding magnet 45. When the power supply switch 13 is closed, the transistors 39 and 40 are turned ON to energize the magnet 45 to hold the trailing shutter of the focal plane shutter. When the shutter is released and the normally closed switch 35 is opened, the timing capacitor 34 starts to be charged. Then, when the terminal voltage of the timing capacitor 34 rises up to the threshold level of the Schmit circuit comprising said third field effect transistor 36 and the fourth transistor 39, the third field effect transistor 36 is turned ON and the fourth and fifth transistors 39 and 40 are turned OFF to de-energize the magnet 45. Upon de-energization of the magnet 45, the trailing shutter of the focal plane shutter is released to start to close the shutter.

In the construction of the electric circuit for controlling a focal plane shutter as described hereinabove, the feature of the present invention lies in the provision of said variable resistor 19 which is substituted for said memory capacitor 16 when the mirror is swung up. In order to substitute the variable resistor 19, which is set to have the terminal voltage equivalent to the terminal voltage of the memory capacitor 16, for the memory capacitor 16, said change-over switch 20 is provided to couple the variable resistor 19 to the gate 21a of the first field effect transistor 21 instead of the capacitor 16 when the mirror is swung up.

Figure 2:
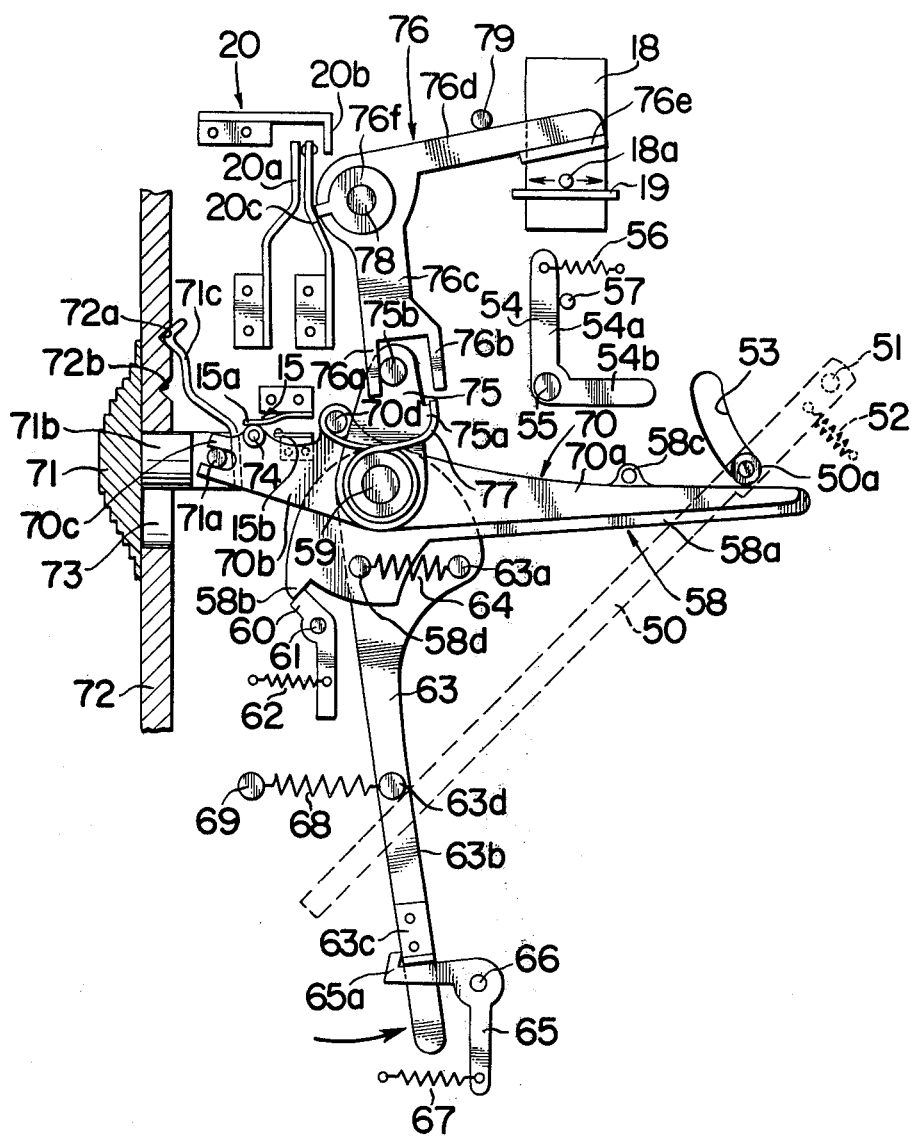
FIG. 2 is a side elevational view showing the internal construction of the mechanism of the independent mirror swing up means for a single lens reflex camera in accordance with an embodiment of this invention in which the mirror is in the normal reflection position.

Now referring to FIG. 2, the construction of the mechanism including the swingable mirror and means for swinging the mirror and locking said slidable needle 18a on the variable resistor 19 will be described in detail together with other means associated with said electric circuit. In the mirror box of the single lens reflex camera, a mirror 50 is swingably mounted on a pivot 51. The swingable mirror 50 is provided with a guide pin 50a on the side edge thereof and urged downward by means of a tension spring 52. The side wall of the mirror box is provided with an arcuate slot 53 through which the guide pin 50a extends. When the swingable mirror 50 swings up, the guide pin 50a moves upward along the arcuate slot 53. An L-shaped shutter start lever 54 is pivotally mounted on a pivot 55 fixed to the side wall of the mirror box and urged to rotate clockwise by means of a tension spring 56. An arm 54a of the L-shaped shutter start lever 54 is pulled by said spring 56 rightward and stopped by a stationary stopper pin 57 on the right side thereof. The other arm 54 b of the L-shaped shutter release lever 54 extends beside the arcuate slot 53 at the upper portion thereof. A mirror swing-up lever 58 is pivotally mounted on a fixed shaft 59. The mirror swing-up lever 58 has a swing-up arm 58a extending under said guide pin 50a of the mirror 50 so that the counterclockwise rotation of the lever 58 may cause the mirror 50 to swing up. The mirror swing-up lever 58 has a tooth 58b which is engaged with and stopped by a pawl 60. The pawl 60 is pivotally mounted on a fixed pivot 61 and spring-biased to be in the engagement position as shown in FIG. 2 by means of a tension spring 62. The swing-up arm 58a of the lever 58 is provided with a pin 58c on the upper side edge thereof which is to abut on the arm 54b of said L-shaped shutter start lever 54 when the swing-up lever 58 is rotated counterclockwise. A shutter charge lever 63 is pivotally mounted on said fixed shaft 59 together with the mirror swing-up lever 58. The shutter charge lever 63 has a pin 63a fixed thereon, and the mirror swing-up lever 58 has a pin 58d fixed thereon on the same side thereof. Between the pins 63a and 58d is tensioned a spring 64 to urge the shutter charge lever 63 leftward or clockwise. The shutter charge lever 63 has an arm 63b which is provided with an engaging piece 63c which is in turn to be engaged with a hook 65a of a hook lever 65 pivotally mounted on a fixed shaft 66. The hook lever 65 is spring-biased to be in the engaging position by means of a tension spring 67. The arm 63b of the shutter charge lever 63 is provided with a pin 63d which is engaged with an end of a tension spring 68 fixed at the other end thereof to a fixed pin 69. When the shutter charge lever 63 is rotated counterclockwise against the spring force of the tension spring 68 by a film wind-up mechanism, the engaging piece 63 thereof is brought into engagement with the hook 65a of the hook lever 65 as shown in the drawing.

Thus, the shutter charge lever 63c is held in its biased position in which the mirror swing-up lever 58 is biased to rotate counterclockwise by the spring force of the tension spring 64. The pawl 60 which prevents the rotation of the mirror swing-up lever 58 is moved to release the swing-up lever 58 upon depression of a shutter button (not shown).

In operation of the above-described mirror swing-up mechanism, the pawl 60 is rotated counterclockwise to release the mirror swing-up lever 58 upon depression of the shutter button. By the release of the mirror swing-up lever 58, the lever 58 is rotated counterclockwise by the spring force of said tension spring 64 tensioned between the charge lever 63 and the swing-up lever 58. By the counterclockwise rotation of the swing-up lever 58, the swing-up arm 58a of the lever 58 moves said guide pin 50a of the mirror 50 upward along the arcuate slot 53 and the mirror 50 is swung up. After the mirror 50 is swung up, the pin 58c on the arm 58a strikes the arm 54b of the L-shaped shutter start lever 54 upward to rotate the shutter start lever 54 counterclockwise. Thus, the shutter is started after the mirror is swung up. Now, when the mirror 50 is swung up the photoelectric element 11 is cut from the light incident into the camera body and it becomes impossible to measure the illumination. However, there is no fear that the memory capacitor 16 should be influenced by swing up of the mirror, since the switch 17 is opened upon start of the shutter operation as mentioned before.

Figure 3:
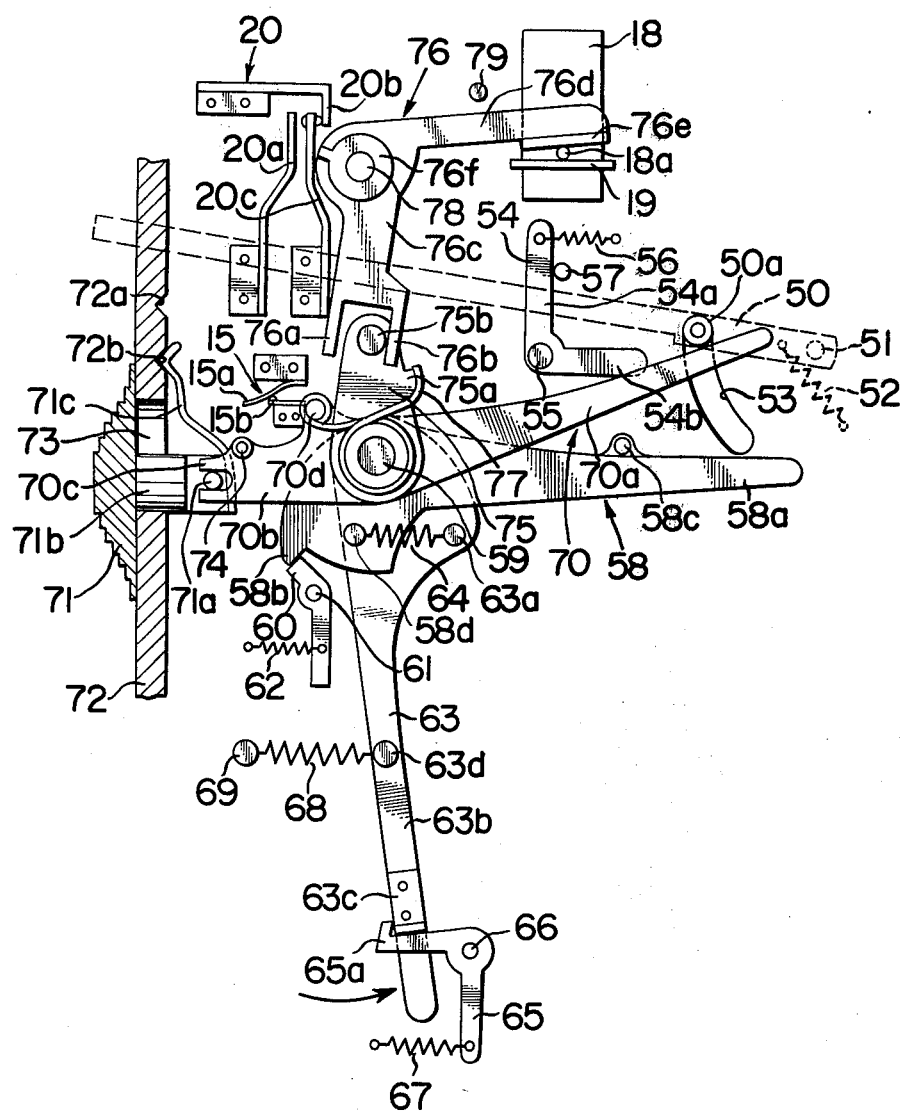
FIG. 3 is a side elevational view of the independent mirror swing-up means similar to FIG. 2 in which the mirror is in the swung up position.

Now, in addition to the above described mirror swing up mechanism, the mechanism in accordance with the present invention as shown in FIGS. 2 and 3 includes a manual independent mirror swing-up means provided with said exposure information memorizing means as described hereinbelow. A manual mirror swing-up lever 70 is pivotally mounted on said fixed shaft 59 together with said mirror swing-up lever 58 and said shutter charge lever 63. The manual mirror swing-up lever 70 has two arms 70a and 70b extending in the opposite directions, one of which 70a extends in the same direction as said swing-up arm 58a of the lever 58 and serves to move up the guide pin 50a in the same manner as that of said swing-up arm 58a. The other of the arms 70b has a forkshaped end 70c which is engaged with a pin 71a fixed to a stud 71b of a manually operable slide knob 71. The slide knob 71 is slidable on the surface of the wall 72 of the mirror box with the stud 71b thereof being guided in a slot 73 provided in the wall 72. Said arm 70b of the manual mirror swing-up lever 70 has on its upper edge a switch operating pin 74. On the side wall of the mirror box is fixed said second power supply switch 15 so as to be closed when the arm 70b moves down. The power supply switch 15 comprises a spring contact 15a and a stationary contact 15b, and said spring contact 15a is biased to contact the stationary contact 15b to close the switch 15. The spring contact 15a extends over said switch operating pin 74 so that the spring contact 15a may be separated from the stationary contact 15b by the pin 74 when the arm 70b moves upward. The stud 71b of the manual knob 71 has at its end a click stop spring 71c which is spring-biased on the internal wall surface of the wall 72 and selectively click-engaged with a click notch 72a or 72b. In the position where the click stop spring 71c is engaged with the upper click notch 72a, the arm 70b is in its upper position and the spring contact 15a is separated from the stationary contact 15b as shown FIG. 2.

In the position where the click stop spring 71c is engaged with the lower click notch 72b, the arm 70b is in its lower position and the spring contact 15a is in contact with the stationary contact 15b to close the switch 15 as shown in FIG. 3. In this position, the other arm 70a of the manual mirror swing-up lever 70 is in the upper position where the guide pin 50a of the mirror 50 is raised up to the highest position where the mirror is swung up. An interconnection lever 75 is pivotally mounted on the fixed shaft 59 and spring-biased toward the manual mirror swing-up lever 70 by means of a spring 77 which is wound around the shaft 59 and is engaged at an end thereof with a pin 70d fixed to the lever 70 on the forked arm 70b side and at the other end thereof with an engaging portion 75a of the lever 75 on the opposite side thereof to said pin 70d. The interconnection lever 75 has at the end thereof a pin 75b which is loosely engaged between forks 76a and 76b formed at an end of an arm 76c of a locking lever 76 which in turn is pivotally mounted on a fixed shaft 78. The other arm 76d of the locking lever 76 is engaged with a stopper pin 79 on one side thereof so that the locking lever may not rotate counterclockwise over a certain limit position. On the opposite side of the arm 76d to the stopper pin 79 is provided an insulating layer 76e fixed to the side edge thereof. The insulating layer 76e is faced to said needle 18a of the galvanometer 18 slidable on said variable resistor 19 shown in the circuit of FIG. 1. The needle 18a of the galvanometer 18 is electrically connected with said contact 20b of the change-over switch 20. The locking lever 76 is further provided with a cam 76f fixed thereto around the fixed shaft 78. In contact with the cam 76f is provided a spring contact 20c which is selectively put into contact with said contact 20a or 20b. As shown in the drawing, the spring contact 20c is located between the contacts 20a and 20b of the change-over switch 20 and is separated from the contact 20a and put into contact with the contact 20b when the locking lever 76 rotates clockwise. Further, as shown in FIG. 3 the slidable needle 18a made of conductive material is locked on the variable resistor 19 by the arm 76d bearing the insulating layer 76e when the locking lever 76 rotates clockwise.

In operation of the above-described independent mirror swing-up mechanism shown in FIG. 2, the manual mirror swing-up lever 70 is rotated counterclockwise when the manually operable slide knob 71 is moved down manually as shown in FIG. 3. First, the spring contact 15a is put into contact with the stationary contact 15b and the second power supply switch 15 is closed as the switch operating pin 74 moves down as the manual knob 71 is slided down. Then, the interconnection lever 75 is rotated counterclockwise being pulled by the spring 77 as the lever 70 turns counterclockwise. As the interconnection lever 75 rotates counterclockwise, the pin 75b pushes the fork 76a leftward to rotate the locking lever 76 clockwise. In the initial stage of the clockwise rotation of the locking lever 76, the cam 76f pushes the spring contact 20c leftward. After the locking lever 76 rotates clockwise to some extent, however, the projected portion of the cam 76f is reversely pushed by the spring contact 20c and the spring contact 20a of the change-over switch 20 and accordingly the locking lever 76 is urged to rotate clockwise and locks the needle 18a on the variable resistor 19 by the spring force of the spring contact 20c. At this stage, the fork 76a is separated from the pin 75b. By further sliding the manual knob 71 downward, the manual mirror swing-up lever 70 further rotates counterclockwise and the arm 70a thereof abuts on the guide pin 50a of the mirror 50 and moves the mirror 50 upward. When the click stop spring 71c comes into engagement with the lower click stop notch 72b, the mirror swing-up operation is completed. At this time, the exposure information is given by the variable resistor 19 which memorizes the exposure information given by the capacitor 16. Under this condition, the shutter start lever 54 can be operated to rotate counterclockwise by a separate mechanism for releasing the shutter. Thus, it becomes possible to repeatedly take pictures with the exposure information locked in the variable resistor 19. Since the mirror 50 is swung up independently of the shutter release, the camera body is completely free from vibration caused by the swing up movement of the mirror when the shutter is released.

In order to release the mirror swing-up operation, the manually operable knob 71 is slightly moved upward to disengage the click stop spring 71c from the lower click notch 72b. Since the pin 75b of the interconnection lever 75 is engaged with the fork 76a of the locking lever 76, the lever 75 is spring biased to rotate counterclockwise being pulled toward the arm 70b by means of said spring 77. That is, the arm 70b of the lever 70 is pulled in the clockwise direction by the spring 77. Therefore, by slightly moving the knob 71 upward, the manual mirror swing-up lever 70 rotates clockwise and the mirror 50 is returned to the lower position by the tension of the spring 52. Then, the fork 76b of the locking lever 76 is pushed by the pin 75b and the locking lever 76 is rotated counterclockwise up to the original position. Thus, the independent swing up of the mirror 50 and the locking of the exposure information by the arm 76d is released.

Figure 4:
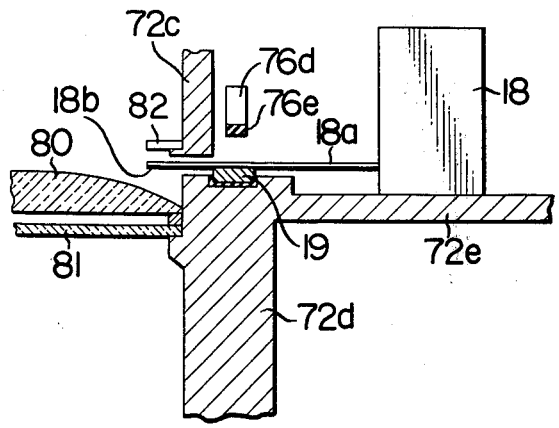
FIG. 4 is an enlarged fragmentary sectional side view showing the detailed construction of an exposure information indicator employed in connection with the exposure information locking means in the independent mirror swing up means in accordance with an embodiment of the present invention.

Now referring to FIG. 4 showing the detailed construction of the exposure information locking means, a galvanometer 18 is located on a support board 72e integrally connected with the side wall 72d of the mirror box. The needle 18a of the galvanometer 18 slides on the variable resistor 19 mounted on the side wall 72d of the mirror box. Above the variable resistor 19 and the needle 18a is provided said arm 76d bearing said insulating layer 76e. The end 18b of the needle 18a projects out of the side wall 72d so that the end 18b may be viewed in the view finder through a scale 82 which carries the scale of shutter speed. The scale 82 is fixed to the side wall 72c above said wall 72d. The reference numeral 80 indicates a convex lens in the view finder optical system and the numeral 81 indicates a focussing glass on which the image is focussed. Through the view finder, the shutter speed actually controlled can be seen at the end 18 b of the needle 18 with reference to the shutter speed scale 79.

What is claimed is:

1. In a single lens reflex camera having a focal plane shutter, a mirror automatically swingable from a reflecting position to a folded position by means of an automatic mirror swing up means, in response to the release of the shutter of the camera, a memory type electric shutter control means having a memorizing capacitor and circuit means controlling the operation of the focal plane shutter in the camera, a taking lens, the quantity of light passing through the taking lens being measured by a photoelectric element located in a view finder optical system receiving the light reflected from the mirror, the output of this photoelectric element being connected to said memorizing capacitor in the memory type electric shutter control means, and an electric power supply for the memory type electric shutter control means the improvement comprising: a variable resistor connected across said electrical power supply, means for swinging the mirror to the folded position independently of the release of the shutter, electrical responsive means having a needle movable in response to an electrical potential applied thereto and being connected in parallel with the memorizing capacitor, said needle forming a contact for said variable resistor, the position of said needle being determined by said potential which exists across terminals of the memorizing capacitor, a switch-over means for selectively coupling the memorizing capacitor or the variable resistor to circuit means in the electric shutter control means, locking means operatively connected between said means for independently swinging the mirror and said slidable contact, said locking means fixing the position of said slidable contact on said variable resistor and operating said switch-over means to connect said variable resistor in, and to disconnect said memorizing capacitor from, said circuit means when said means for independently swinging said mirror to its folded position is operated.

2. In a single lens reflex camera as defined in claim 1 wherein said electrical responsive means is a galvanometer.

3. In a single lens reflex camera as defined in claim 2 having a view finder optical system, wherein said slidable contact is a needle of said galvanometer made of conductive material.

4. In a single lens reflex camera as defined in claim 3 wherein the end of said needle of the galvanometer is projected into said view finder optical system so that said end may be viewed through the view finder system.

5. In a single lens reflex camera as defined in claim 4 wherein a shutter speed scale is provided along the path of the movement of the end of the needle.

6. In a single lens reflex camera as defined in claim 1 wherein said locking means is a rotatable locking lever having a portion to hold said slidable contact on said variable resistor and a portion to operate said switch-over means, by the rotation of said lever in one direction the switch-over means is turned from said memorizing capacitor to said variable resistor and the slidable contact is held on the variable resistor.

7. In a single lens reflex camera as defined in claim 6 wherein said means for independently swinging the mirror includes a manually rotatable mirror swing-up lever interconnected with said locking lever, said locking lever being rotated in said one direction when the manually rotatable mirror swing-up lever rotated to swing the mirror to the folded position.

8. In a single lens reflex camera as defined in claim 7 wherein an interconnection lever is connected with both said manually rotatable mirror swing-up lever and said locking lever for transmitting the movement of the former to the latter, said interconnection lever being biased to move the mirror swing-up lever in the direction to return the mirror from the folded position to the reflecting position.

9. In a single lens reflex camera as defined in claim 7 wherein there is provided a power supply switch in series with said electrical power supply, said manually rotatable mirror swing-up lever being provided with a switch operating means which closes said power supply switch when said mirror swing-up lever is moved in the direction to swing the mirror to the folded position.

10. In a single lens reflex camera as defined in claim 9 wherein there is provided a manually operable power supply switch in series with said electrical power supply, said power supply switch being connected in parallel with said manually operable power supply switch.

11. In a single lens reflex camera as defined in claim 1 wherein said switch-over means is a change-over switch comprising a first stationary contact connected with said memorizing capacitor, a second stationary contact connected with said slidable contact and a third contact connected with the shutter control circuit means, said third contact being selectively movable into contact with said first and second contacts, and said locking means is a locking lever operatively connected with said means for independently swinging said mirror to its folded position and movable between a first position and a second position, in the first position of the locking lever the slidable contact being free to slide on the variable resistor and the mirror being in its normal reflecting position, and in said second position the locking lever holding the slidable contact on said variable resistor and the mirror being in its folded position, and said locking lever is provided with a switch operating means which moves said third contact into contact with said first contact when the locking lever is moved into said first position and moves said third contact into contact with said second contact when the locking lever is moved into said second position.

12. In a single lens reflex camera as defined in claim 11 wherein said switch operating means is a cam attached on said locking lever, and said third contact is biased to follow the cam.

13. In a single lens reflex camera as defined in claim 11 wherein said means for independently swinging said mirror to its folded position is a mirror swing-up lever pivotally mounted on a fixed shaft and operatively connected with a manually operable knob so as to be moved thereby between a first position to set the mirror in the normal reflecting position and a second position to keep the mirror in the folded position.

14. In a single lens reflex camera as defined in claim 13 wherein there is provided a power supply switch in series with said electrical power supply, and said mirror swing-up lever is provided with a switch operating means to close said power supply switch when the lever is moved from said first position to said second position.

* * * * *